US012694750B1

(12) United States Patent
Mostashari

(10) Patent No.: US 12,694,750 B1
(45) Date of Patent: Jul. 28, 2026

(54) SPECIALIZED GAMING TABLE SYSTEM FOR ENABLING SECONDARY GAME

(71) Applicant: Moe Mostashari, Los Angeles, CA (US)

(72) Inventor: Moe Mostashari, Los Angeles, CA (US)

( * ) Notice: Subject to any disclaimer, the term of this patent is extended or adjusted under 35 U.S.C. 154(b) by 228 days.

(21) Appl. No.: 18/381,631

(22) Filed: Oct. 18, 2023

Related U.S. Application Data

(63) Continuation-in-part of application No. 18/231,212, filed on Aug. 7, 2023, now abandoned, which is a continuation of application No. 18/198,243, filed on May 16, 2023, now abandoned.

(60) Provisional application No. 63/347,938, filed on Jun. 1, 2022, provisional application No. 63/342,595, filed on May 16, 2022.

(51) Int. Cl.
*G07F 17/32* (2006.01)
*G06F 7/58* (2006.01)

(52) U.S. Cl.
CPC ............ *G07F 17/322* (2013.01); *G06F 7/588* (2013.01); *G07F 17/3211* (2013.01); *G07F 17/3267* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 10,964,171 | B1* | 3/2021 | Brett | ................... G07F 17/3262 |
| 11,127,263 | B1* | 9/2021 | Isso | ...................... G07F 17/3223 |
| 2014/0066155 | A1* | 3/2014 | Noyes | ................. G07F 17/3244 |
| | | | | 273/292 |
| 2016/0008702 | A1* | 1/2016 | Hall | ................... A63F 3/00157 |
| | | | | 463/12 |
| 2022/0005324 | A1* | 1/2022 | Isso | ........................ G07F 17/326 |
| 2025/0148878 | A1* | 5/2025 | Pertgen | ............... G07F 17/3225 |

* cited by examiner

*Primary Examiner* — Ronald Laneau
(74) *Attorney, Agent, or Firm* — Newman Law, LLC

(57) ABSTRACT

A specialized gaming table configured to provide a secure second game for an underlying wagering game in a casino which is configured to display selectable options on a user interface responsive to a triggering event in the underlying game, with the selected option being combined with results in the underlying game and compared with a second game winning criteria to determine a second game outcome.

8 Claims, 4 Drawing Sheets

110

200

| | |
|---|---|
| 202 | Wagering game is played at the gaming table |
| 204 | Triggering event is detected |
| 206 | Randomly display selectable options on the user interface(s) |
| 208 | Receive selection of selectable option through the user interface(s) |
| 210 | Reveal content of selectable option |
| 212 | Determine the impact of the selected selectable option for each player and apply to the wagering game |

SPECIALIZED GAMING TABLE SYSTEM FOR ENABLING SECONDARY GAME

BACKGROUND OF THE INVENTION

Field of the Invention

The present invention relates to the field of gaming, particularly to the field of wagering games, and more particularly to modified systems and methods for providing, hosting, conducting and/or facilitating wagering games involving a first game which may be played with real or virtual standard playing cards and an interactive second game available to players of the first game.

Background of the Art

Many card games have been developed over the years and some are particularly adapted for gambling. Typically, such games include a dealer who deals cards and one or more players who place wagers on whether an outcome will be achieved based on the cards that the dealer deals.

An example is Blackjack which is also known as Twenty-One. The objective of Blackjack is for a wagering player to finish a round of play with a hand of playing cards with a sum of the total value of cards coming as close as possible to the value of twenty-one, without the player hand total exceeding twenty-one. The game is played by one or more players against a dealer with the player making an initial wager on a final outcome under the rules of blackjack, which remain fairly consistent throughout the world, and with only minor variations in different casinos or jurisdictions. Players' hands that are less than or equal to twenty-one, and exceed the value of the dealer's hand wins. All players' hands that have a lower sum than the dealer's hand and all hands that exceed the sum of twenty-one lose. Dealer and Player hands with the same total value (without the player first busting, result in ties (called a "push"). An initial two-card hand totaling twenty-one points is called black-jack, and in the absence of the dealer having a similar hand, automatically wins, without respect to the dealer's hand final; count and is often paid at odds greater than 1:1.

One conventional method of playing Blackjack uses one or more standard decks of playing cards (a fifty-two card deck without jokers). Each numbered card is counted according to its face value. The Jacks, Queens and Kings are worth ten (10), and Aces are worth either one (1) or eleven (11), depending on which is most beneficial to the count of the hand. A "ten" card therefore hereinafter includes any card which has a value of ten in the game of Blackjack, that is, a numbered 10 card, Jacks, Queens and Kings.

Once all the bets are made, the dealer will deal the cards to the players. The dealer will make two passes around the table starting with the player farthest to the left so that the players and the dealer have one card after the first pass and then receive a second card each after the second pass. The two cards dealt to the dealer or house includes one card face up or otherwise exposed to view, usually the second (and last) card dealt.

A player views an initial value of cards in the player's hand, views the dealer's up-card (the exposed card) and then makes decisions on drawing or not drawing further playing cards. This further drawing is done in an attempt to try and win the hand by having a higher count than the dealer's hand without busting, or allowing the dealer to bust the house hand. The player can "stand" on any count of twenty-one or less. Once the player exceeds a count of twenty-one or "busts," the player wager is lost, whatever the ultimate point count of the dealer's hand. Usually, the dealer must hit when with a point count of less than seventeen. Normally a dealer must stand on a soft count of at least seventeen, a soft count being a hand value where an Ace is counted as a value of eleven. House rules may vary, however.

Baccarat is another popular game that is played in most casino environments. It may take the form of a card table game, played with a shoe of cards that is typically an aggregation of several randomly-ordered standard decks of fifty-two physical playing cards, or it can be simulated as an electronic table game or an online game.

The object of the game of Baccarat is for the bettor to successfully wager on whether the Bank's hand or the Player's hand is going to win. The bettor receives even money for his wager if he selects the winning hand and loses his wager if he selects the losing hand. Because of the rules of play of Baccarat and more particularly the pre-established draw rules, the Bank's hand has a slightly higher chance of winning than does the Player's hand. The winning frequency for the Bank's hand has been determined to be 0.45859 (45.859%) whereas the winning frequency for the Player hand is 0.44624 (44.624%) with the remainder of the outcomes being ties. Therefore, if the bettor wagers on the Bank's hand and the Bank hand wins, the bettor must pay to the gaming establishment a commission (typically, 5%) of the amount the bettor wins. No commission is paid if the bettor successfully wagers on the Player's hand.

As used in this specification, the term "Conventional Manner of Play of Baccarat" is as follows:

A multiple number of decks of standard playing cards, 52 in number, are used; typically eight decks, or 416 playing cards, are shuffled together and placed in a shoe from which the cards are dealt during the play of the game.

Each bettor makes a wager on whether the Bank's hand or the Player's hand will win. After all wagers are made, two cards are dealt from the shoe to the Bank position and two cards are dealt from the shoe to the Player position on the table layout. The cards are turned face up and the value of the Bank hand the Player hand is determined, modulo ten.

Aces count one; Kings, Queens, Jacks and Tens count zero and the other cards count their respective face value. The suits (Spades, Hearts, Diamonds and Clubs) have no meaning in Baccarat.

The highest hand value in Baccarat is nine. All hand values range from a low of zero to a high of nine. If when the cards are added together, the total of the hand exceeds nine, then the hand value is determined modulo ten. For example, a seven and an eight total fifteen, but the hand value is five. An Ace and a nine total ten, but the hand value is zero.

A two card total of eight or nine is called a "natural"; a two card total of zero is called a "baccarat." As will be explained below, in certain situations in the play of the game, a third card will be dealt. The value of this third card is added to the total of the first two cards and a new hand value is established. Again, if the new hand total exceeds nine, the hand value is determined by subtracting ten from the total of the hand.

Prior to the deal, each better can make one of three wagers: 1) that the Bank hand will win; 2) that the Player hand will win; or 3) that the Bank hand and the Player hand will tie. Wagering locations are provided on the Baccarat table layout. Whichever of the Bank hand or the Player hand is closest to a total on nine is the winner.

All winning Bank hand wagers are paid off at odds of one-to-one and the house charges a five percent (5%)

commission on the amount won by the bettor. For example, if a bettor wagers $100 on the Banker hand and the Banker hand wins, the bettor wins $100 and is charged a $5 commission on the amount that the bettor won.

All winning Player hand wagers are paid off at odds of one-to-one and the bettor is not charged any commission on the amount of his winnings or his wager because the house, by virtue of the third card draw rules, has a statistical advantage over the player of 45.859-44.624 or 1.235% which is the vigorish ("vig") of the house on player wagers. Winning wagers on the Tie hand bet are paid off at odds of nine-to-one or eight-to-one (depending on the gaming establishment) and the bettor is not charged any commission on the amount of his winnings or his wager since there is already a statistical advantage in favor of the house on tie wagers. If a Tie hand occurs, all wagers on the Bank hand and all wagers on the Player hand are "pushes" and the amount wagered is returned to the bettor.

Depending on the point total of the Player's hand and the Banker's hand, an additional card may be dealt to the Player's hand, the Banker's hand, or both. The rules for determining whether a third card is dealt are fixed rules, there is no discretion for either the Player's hand or the Banker's hand on whether a third card is dealt.

If either the Player hand or the Banker hand has a point total of eight or nine on the first two cards, no third card is dealt to either hand and the hand with the highest point total is the winner (or the hand is a Tie, as the case may be). If neither the Player hand nor the Banker hand has a point total of eight or nine, then there is a possibility of a third card draw.

The third card draw rules are as follows:

Rule #1: If the initial two card Player hand has a point total of 0, 1, 2, 3, 4 or 5, the Player hand draws a third card. If the initial two card Player hand has a point total of 6 or 7, the Player hand stands and does not receive a third card.

Rule #2: If the Player hand stands and does not draw a third card, then the Banker hand follows Rule #1. In other words, if the Player hand has a point total of 6 or 7, the Bank hand draws a third card on a point total of 0, 1, 2, 3, 4 or 5 and the Bank hand stands on a point total of 6 or 7. Rule #3: If the Player hand draws a third card, the Bank hand must draw or stand as follows:

TABLE 1

| BACCARAT RULES | |
| --- | --- |
| PLAYER | |
| HAVING TWO CARD TOTAL OF | |
| 1-2-3-4-5-10 | DRAWS A CARD |
| 6-7 | STANDS |
| 8-9 | TURNS CARDS OVER |
| BANKER | | |

| HAVING TWO CARD TOTAL OF | DRAWS WHEN GIVING OR PLAYER'S THIRD CARD DRAW IS AN | DOES NOT DRAW WHEN GIVING OR PLAYER'S THIRD CARD DRAW IS AN |
| --- | --- | --- |
| 0, 1, 2 | ALWAYS DRAWS | |
| 3 | 1-2-3-4-5-6-7-9-10 | 8 |
| 4 | 2-3-4-5-6-7 | 1-8-9-10 |
| 5 | 4-5-6-7 | 1-2-3-8-9-10 |
| 6 | 6-7 | 1-2-3-4-5-8-9-10 |

TABLE 1-continued

| BACCARAT RULES | |
| --- | --- |
| 7 | STANDS |
| 8-9 | TURNS CARDS OVER |

At the end of each hand, winning wagers are paid and losing wagers are collected by the house. Any commission due to the house is marked in commission boxes in the center of the table. Gaming chips are used to represent the amount of money owed by each bettor to the house for the commissions. In order not to slow down the game, the commission is not actually collected from each bettor until the end of the round determined by all of the cards in the shoe being dealt down to the plastic cut card, usually approximately eighty hands.

The mathematical analysis of the game reveals that the 5% commission is what gives the house its advantage on wagers on the Banker hand and allows the gaming establishment to make a profit from providing the Baccarat game to the bettors. Because the rules for standing and drawing third cards are automatic, the mathematical analysis shows that the Bank hand will win 45.859% of the hands, the Player hand will win 44.624% of the hands and the Tie hand will occur 9.517% of the hands. If the Tie hands are disregarded because they do not affect any Player or Bank wagers, it is then determined that the Bank hand will win 50.7% of the time and the Player hand will win 49.3% of the time.

Because the Bank hand wins more than 50% of the hands (disregarding the Tie hands that do not affect any Player or Bank wagers), if a bettor always bet on the Bank hand, the bettor would have an advantage over the gaming establishment. By charging a 5% commission on all Bank hand wins, the gaming establishment compensates for the percentage of winning Bank hands being slightly over 50%.

After figuring in the 5% commission that must be paid by bettors on winning Bank hands, the gaming establishment has approximately a 1.23% advantage over the bettor when the bettor wagers on the Player hand and the gaming establishment has a 1.057% advantage over the bettor when the bettor wagers on the Bank hand. The Tie hand wager gives the gaming establishment a 4.88% advantage over the bettor when the payoff odds are nine-to-one and a 14.1% advantage over the bettor when the payoff odds are eight-to-one.

While Blackjack and Baccarat are popular games, many new games which are quickly rising in popularity provide numerous wagering opportunities, some of which involve risky or large wagering opportunities, thus increasing player participation and excitement. Consequently, further variations of existing wagering games, including associated games and improvements thereto, are of continuing interest to players and casinos, and therefore, there is a desire for systems and methods which would effectively increase wagering opportunities during play of the games of Blackjack and Baccarat.

SUMMARY OF THE INVENTION

Some embodiments of the invention are directed to a specialized gaming table which is configured to monitor play of underlying game thereon through card reading devices to detect cards as they are dealt and/or wager sensors, detect a trigger condition in the underlying game for activating a secondary game, with the display of the secondary game being through one or both of a display device operatively associated with the gaming table or through a user interface display mounted at each player position. The specialized gaming table includes a processing device and random number generator for randomly generating secondary game options which are displayed on one or both of the display device and user interface display. A wager may be submitted through the user interface display to participate in the secondary game. Selecting a secondary game option provides secondary game data to be used in combination with some or all of the underlying game data randomly generated in the underlying game, such as the cards dealt to form a player hand in the underlying game. The combination of second game data and underlying game data are then compared with preset winning criteria by the processing device to determine an outcome. A winning outcome can result in an award, which may be in the form of credits added to the user interface. The outcome may relate to the underlying game or another game. For example, the second game data may be three playing cards and the underlying game data may be an initial Blackjack or Baccarat hand of two cards, thus forming a combination of five cards as the second game data which is then compared with preset winning criteria comprising certain poker ranks.

Some embodiments of the invention are directed to a specialized gaming table configured to securely provide a second game for an underlying game of Blackjack, the specialized gaming table comprising a user interface, a card reader, a display device, a processing device, memory and a random number generator, the specialized gaming table enabling: detecting a triggering event in the underlying game of Blackjack, wherein the triggering event is a player receiving an initial hand in the underlying game of Blackjack having an initial hand score which is equal to a preset one or more Blackjack hand scores as determined by the card reader in communication with the processing device; displaying on the user interface one or more selectable options for the second game responsive to the occurrence of the triggering event, the one or more selectable options being displayed in one or more positions on the user interface, wherein each position of the one or more positions is randomly determined by the processor in communication with the random number generator, and wherein each selectable option of the one or more selectable options is associated with a numerical value, the numerical value associated with each selectable option being revealed responsive to receiving a selection of each selectable option through the user interface; displaying a second game numerical value on the user interface, the second game numerical value being associated with a selectable option responsive to receiving a wager and a selection of the selectable option through the user interface, wherein the selection of the selectable option deactivates the selectable option whereby the selectable options is unavailable to be selected by another player; determining a second game hand score, the second game hand score being the combination of the initial hand score and the second game numerical value; and determining a winner of the second game by comparing the second game hand score with a preset criteria, such as a numerical value.

In some embodiments, the preset one or more Blackjack hand scores comprise all Blackjack hand scores in the range from twelve to twenty.

In some embodiments, the one or more selectable options comprise virtual representations of one or more decks of playing cards.

In some embodiments, the preset numerical value is twenty-one.

Some embodiments of the invention are directed to a specialized gaming table configured to securely provide a second game for an underlying game of Baccarat, the specialized gaming table comprising a user interface, a card reader, a display device, a processing device, memory and a random number generator, the specialized gaming table enabling: detecting a triggering event in the underlying game of Baccarat, wherein the triggering event is the player wagering on an initial hand in the underlying game of Baccarat having an initial hand score which is equal to a preset one or more Baccarat hand scores as determined by the card reader in communication with the processing device; displaying on the user interface one or more selectable options for the second game responsive to the occurrence of the triggering event, the one or more selectable options being displayed in one or more positions on the user interface, wherein each position of the one or more positions is randomly determined by the processor in communication with the random number generator, and wherein each selectable option of the one or more selectable options is associated with a numerical value, the numerical value associated with each selectable option being revealed responsive to receiving a selection of each selectable option through the user interface; displaying a second game numerical value on the user interface, the second game numerical value being associated with a selectable option responsive to receiving a wager and a selection of the selectable option through the user interface, wherein the selection of the selectable option deactivates the selectable option whereby the selectable options is unavailable to be selected by another player; determining a second game hand score, the second game hand score being the combination of the initial hand score and the second game numerical value according to the rules of the underlying game of Baccarat; and determining a winner of the second game by comparing the second game hand score with a preset criteria, such as a preset numerical value.

In some embodiments, the preset one or more Baccarat hand scores comprise all Baccarat hand scores in the range from zero to eight.

In some embodiments, the one or more selectable options comprise virtual representations of one or more decks of playing cards.

In some embodiments, the preset numerical value is nine.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF SOME EMBODIMENTS OF THE INVENTION

The invention is directed to systems and methods of providing, hosting and playing an interactive second game associated with a first game. While the embodiments of the invention described herein are used in connection with the games of Blackjack and Baccarat, it should be readily apparent that this is exemplary of the invention, and the invention is not limited to applications involving the games of Blackjack and Baccarat.

Figure 1:
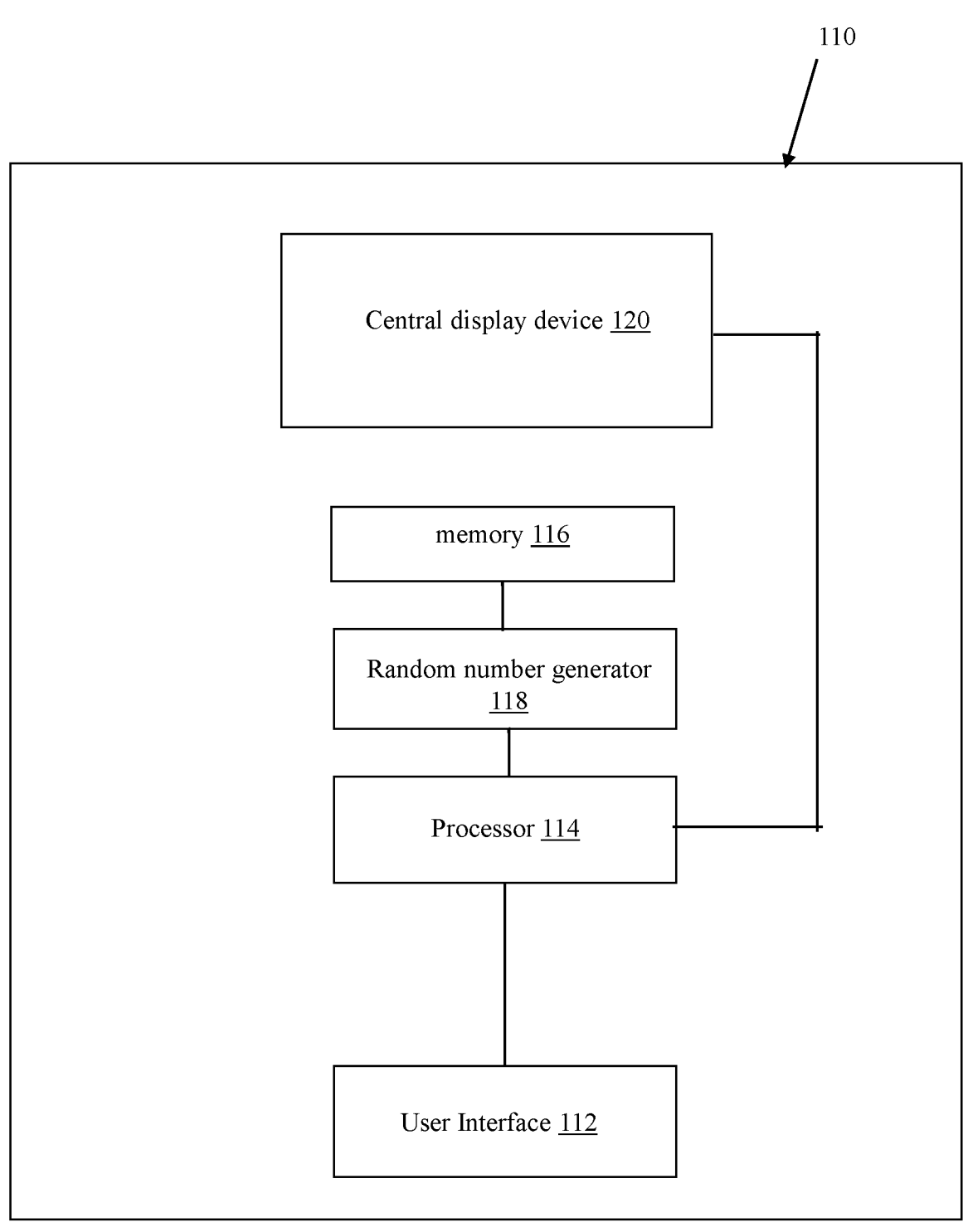
FIG. 1 illustrates a schematic diagram of exemplary components of a specially configured gaming table constructed in accordance with some embodiments of the invention.

Some embodiments of the invention are directed to the use and operation of a specially configured gaming table 110, which as shown in FIG. 1, includes a user interface 112 for each player position at table 110. User interfaces 112 are in communication with a processor 114, memory 16 and a random number generator 118. Gaming table 110 in this embodiment includes a central display device 120.

Figure 2:
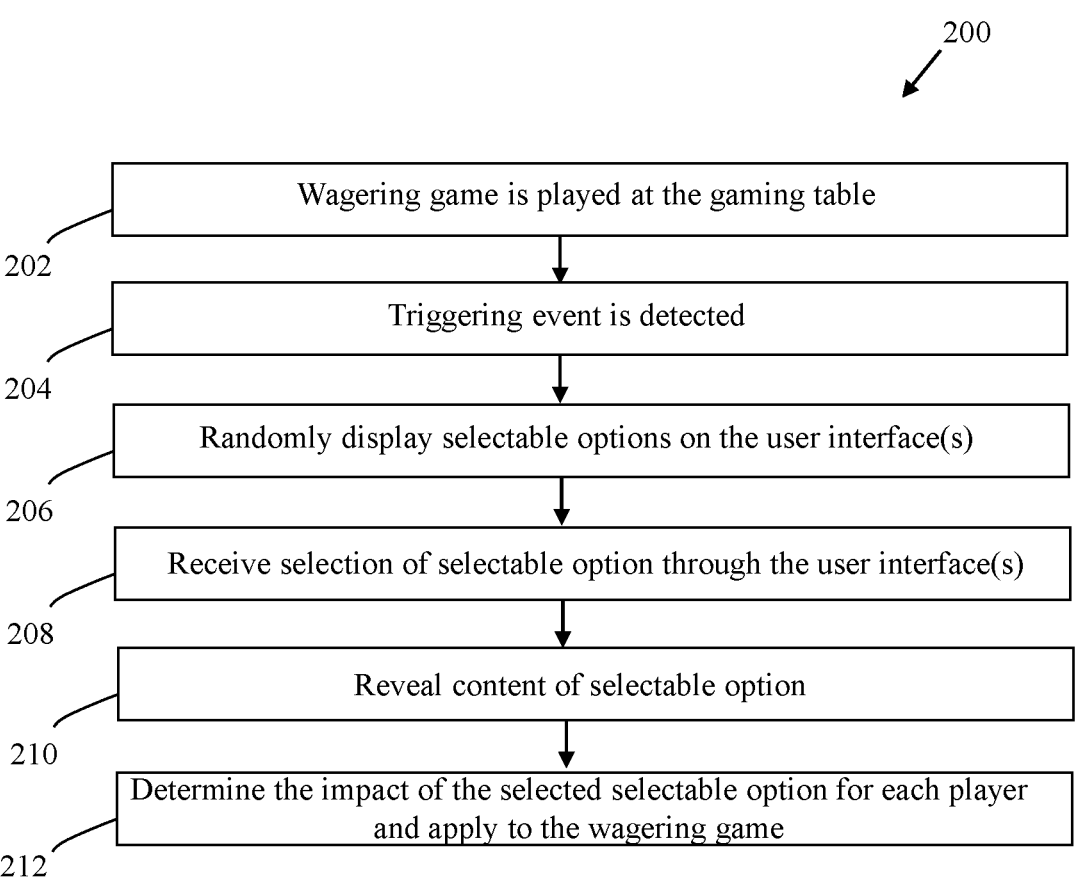
FIG. 2 is a process flow chart depicting an exemplary method for administering and conducting a wagering game using the specially configured gaming table of FIG. 1, which is configured to utilize the specially configured gaming table according to some embodiments of the invention.

A first method of operation of gaming table 110 is generally indicated by reference numeral 200 in FIG. 2. In step 202, a wagering game is either displayed or presented to a user at table 110, such as a wagering card game. Upon detection of a triggering event in step 204, processor 114 actuates random number generator 118 to generate a random display of selectable options stored in memory 116 on user interface 112 for one or more players in step 206. The random display of selectable options may also be displayed on central display device 120.

The triggering event may be or relate to one or more of a specific card, one or more cards, a hand rank achieved, a player hand, a dealer hand, a banker hand, or certain cards being dealt. The triggering event may be detected by an automated card shuffling device and/or a card shoe having card reading capability which are configured to read the value of playing cards as they are distributed, and determine hand values and results in the game relating to the triggering event, which are received and processed by processor 114, or another processor, and communicated to processor 114.

In embodiments where the triggering event results in the random display of selectable options on user interfaces 112 for two or more player positions, the random display of the plurality of selectable options on user interface 112 by random number generator 118 may differ for each player position or be the same for each player position. For example, random number generator 118 may be used to randomly determine the location or placement of the selectable options on each user interface 112 for one or all player positions. In embodiments where the random number generator 118 randomly determines a display of selectable options for all user interfaces 112, the same display may be duplicated on central display device 120 for all players at table 110 to view.

In this embodiment, the selectable options are presented on user interfaces 112 with the content of the selectable options remaining unknown to the player. In step 208, each player selects a selectable option through the user interface 112 at the player's player position, which will result in the content of the selectable option being revealed in step 210 and having an impact on the wagering game. For example, the selectable option may be a card value, a dice value, a bonus award or multiplier, which effects the outcome of the game for the player that selected the selectable option. In some embodiments, once triggered, the selectable options remain for all players during the round of the wagering game to select from, with a selectable option being unavailable to another player once selected. As shown in step 212, the impact of the selected selectable options is determined and applied in the wagering game for each player.

In some embodiments, the selectable options stored in memory 116 comprise a display of virtual playing cards, that is, playing card values which remain unrevealed until selections are received from a player. In some embodiments, the selectable options comprise one or more decks of playing card values displayed as face-down playing cards on the user interface.

In some embodiments, the wagering game is Blackjack and the triggering event is a player receiving an initial hand of cards in the Blackjack game which has a numerical Blackjack hand score within a certain range, such as less than twenty-one, or between ten and twenty or between twelve and twenty. The triggering event may be recognized by a card reader associated with the specially configured gaming table which is capable of determining the initial hand score, such as a card reader of a card shuffler or card shoe associated with the gaming table. Upon detecting the triggering event, the processor displays the selectable options for players eligible to engage in the second game, either at the user interface or the display or both. In some embodiments, each player receives a separate set of selectable options, whereas in other embodiments, all eligible players select from the same selectable options such that upon a selection being received it is no longer capable of being selected by another player.

In some embodiments, a player may engage in the second game without having to submit a second game fee or wager. In the embodiment discussed herein, a player must also submit a second game wager to be settled by the outcome of the second game, which may be placed through the user interface from credit stored in a player account or at the gaming table. A player may then select a selectable option displayed, such as by touching one of the selectable options displayed at the user interface, which results in the revealing of a playing card value. The revealed playing card value may be displayed at the user interface or the display associated with the gaming table or both.

In some embodiments, the outcome of the second game and/or the wager for the second game is determined by the second game score, which is the score of the second game hand. In such embodiments, the second game hand is a combination of the cards in the initial hand and the revealed playing card value, and the second game hand score is the combination of the initial hand score and the score associated with the playing card value accordingly.

In some embodiments, if the second game score is determined by the processor to be less than twenty-one, that is, the second game hand would not "bust" according to conventional Blackjack rules, then the second game outcome is a win, whereas if the second game score is determined by the processor to be greater than twenty-one, that is, the second game hand would "bust" according to conventional Blackjack rules, then the second game outcome is a loss. A payout for a second game outcome win may then be made to the winning player, and in some embodiments, the payout amount is at least partially based on the player's hand value in the Blackjack game. For example, a player with an initial hand value of twelve may have a different payout as compared with a player having an initial hand value of seventeen.

In some embodiments, the second game hand is compared by the processor with preset criteria stored in the memory to determine whether the second game is won or lost. The preset criteria may relate to the second game hand including card values of a certain Blackjack or poker rank or certain suits, and/or a second game hand score of a specific number or within a specific range, or which outranks other players second game hands or a dealer formed second game hand.

Once the second game is resolved, play of the Blackjack game may continue. If, for example, a player "hits" in the Blackjack game and receives a playing card which, when added to the initial hand, is determined to make a player either newly eligible for the second game or eligible once again, then the process of receiving a second game wager and determining a second game outcome is repeated as many times as a player is eligible until the Blackjack game is resolved.

In some embodiments, the selectable options are randomly generated once during the Blackjack game. Thus, each additional play of the second game results in previously selected selectable options being displayed and unavailable to be selected again.

Some embodiments of the invention are directed to gaming methods such as those described herein which are provided through one or more electronic terminals connected over a communication network, having one or more display devices, data communication devices and data processing devices associated therewith, comprising a) responsive to the detection of a preset condition for activating a secondary game being satisfied by conditions relating to a player's Blackjack hand in the underlying Blackjack game, accepting a secondary wager at a player position from a player credit balance; b) randomly generating card values and depicting items on a display device to represent that randomly generated card values without revealing the card value; c) receiving a selection from the player of an item depicted on the display device, wherein upon being selected the randomly generated card value is revealed; d) determining a second game hand score by applying Blackjack game scoring rules to a second game hand formed by the card values in the player's Blackjack hand and the selected randomly generated card values; and e) distributing a payout award to the player responsive to the second game hand score satisfying a preset criteria, wherein the preset criteria is the second game hand score being twenty-one or less.

In some embodiments, the wagering game is Baccarat which is accessible through the user interface 12 of the specially configured gaming table 110 that is responsive to the occurrence of a triggering event in the Baccarat game. Once triggered, and if indicated by the player, such as by pressing a special button or placing a wager in a specially designated area of a player position on the gaming table 10 or through user interface 112, then a plurality of selectable options stored in memory 16 are displayed on the user interface 112, wherein the display of the selectable options is determined by the processor 114 in communication with the random number generator 118. For example, the random number generator may be used to determine the placement of the selectable options on the display.

In some embodiments, the triggering event is the initial hand of two cards each for the Player and Banker hands are dealt in the Baccarat game. The triggering event may be recognized by a card reader associated with the specially configured gaming table which is capable of determining the initial Baccarat hand score for the Player and Banker hands, such as a card reader of a card shuffler or card shoe associated with the gaming table. Upon detecting the triggering event, the processor displays the selectable options for players eligible to engage in the second game, either at the user interface or the display or both. In some embodiments, each player receives a separate set of selectable options, whereas in other embodiments, all eligible players select from the same selectable options such that upon a selection being received it is no longer capable of being selected by another player. For example, if the selectable options are a group of playing cards then once a playing card is selected it cannot be selected again during the round.

In some embodiments, a player may engage in the second game without having to submit a second game fee or wager. In the embodiment discussed herein, a player must also submit a second game wager to be settled by the outcome of the second game, which may be placed through the user interface from credit stored in a player account or at the gaming table. A player may then select a selectable option displayed, such as by touching one of the selectable options displayed at the user interface, which results in the revealing of a playing card value. The revealed playing card value may be displayed at the user interface or the display associated with the gaming table or both.

In some embodiments, the outcome of the second game and/or the wager for the second game is determined by the second game score, which is the score of the second game hand. In such embodiments, the second game hand is a combination of the cards in the Player or Banker hand and the revealed playing card value, and the second game hand score is the combination of the Player or Banker hand score and the score associated with the playing card value accordingly.

In some embodiments, the hand the player has wagered on in the first game of Baccarat will be hand used for the second game. In other embodiments the player may select from the Player or Banker hand when placing a wager in the second game and prior to selecting a selectable option for the second game. In still other embodiments, the selectable options are applied to both the Player and Banker hands, thus providing two chances to win the second game.

In some embodiments, if the second game score is determined by the processor to be a natural, that is, an eight or nine according to conventional Baccarat rules, then the second game outcome is a win, whereas if the second game score is determined by the processor to be not a natural, that is, any other score according to conventional Baccarat rules, then the second game outcome is a loss.

A payout for a second game outcome win may then be made to the winning player, and in some embodiments, the payout amount is at least partially based on the player's hand value in the Baccarat game. For example, a player wagering on an initial Player or Banker hand value of eight or nine may have a different payout as compared with a Player or Banker hand having an initial hand value of four.

In some embodiments, the second game hand is compared by the processor with preset criteria stored in the memory to determine whether the second game is won or lost. The preset criteria may relate to the second game hand including card values of a certain Baccarat, Blackjack or poker rank or certain suits, and/or a second game hand score of a specific number or within a specific range, or which outranks other players second game hands or a dealer formed second game hand.

Once the second game is resolved, play of the Baccarat game may continue. In some embodiments, a player may wager again and select a selectable option for determining another second game outcome. In some embodiments this may be repeated as many times as a player is deemed eligible.

In some embodiments, the selectable options are randomly generated once during the Baccarat game. Thus, each additional play of the second game results in previously selected selectable options being displayed and unavailable to be selected again.

Some embodiments of the invention are directed to gaming methods such as those described herein which are provided through one or more electronic terminals connected over a communication network, having one or more display devices, data communication devices and data processing devices associated therewith, comprising a) responsive to the detection of a preset condition for activating a secondary game being satisfied by conditions relating to an underlying Baccarat game, accepting a secondary wager at a player position from a player credit balance; b) randomly generating card values and depicting items on a display device to represent that randomly generated card values without revealing the card value; c) receiving a selection from the player of an item depicted on the display device, wherein upon being selected the randomly generated card value is revealed; d) determining a second game hand score by applying Baccarat game scoring rules to a second game hand formed by the card values in at least one of the Player and Banker hand, or both, and the selected randomly generated card values; and e) distributing a payout award to the player responsive to the second game hand score satisfying a preset criteria, wherein the preset criteria is the second game hand score being eight or nine according to Baccarat game rules.

Some embodiments of the invention are directed to systems for providing the above methods, which may include one or more data communication devices, display devices, and processing devices, which may be local or remote, as necessary to provide these methods on any computerized or partially computerized platforms, online or through a local or global communication network, including mobile devices, home computers, single or multiplayer electronic gaming machines enabling the display of the selectable options, along with play with virtual or real currency and/or virtual playing cards displayed on a display device or real playing cards, such as in the case of multiplayer platforms, devices or kiosks for enabling wagering in the play of a local or broadcast live game.

Various platforms are contemplated that are suitable for implementation of embodiments of wagering games according to this disclosure. For example, embodiments of wagering games may be implemented as live table games with an in-person dealer, electronic gaming machines, partially or fully automated table games, and fully automated, network-administered games (e.g., Internet games) that either produce game results utilizing a processor or produce a live video feed of a dealer administering a game from a remote studio.

Figure 3:
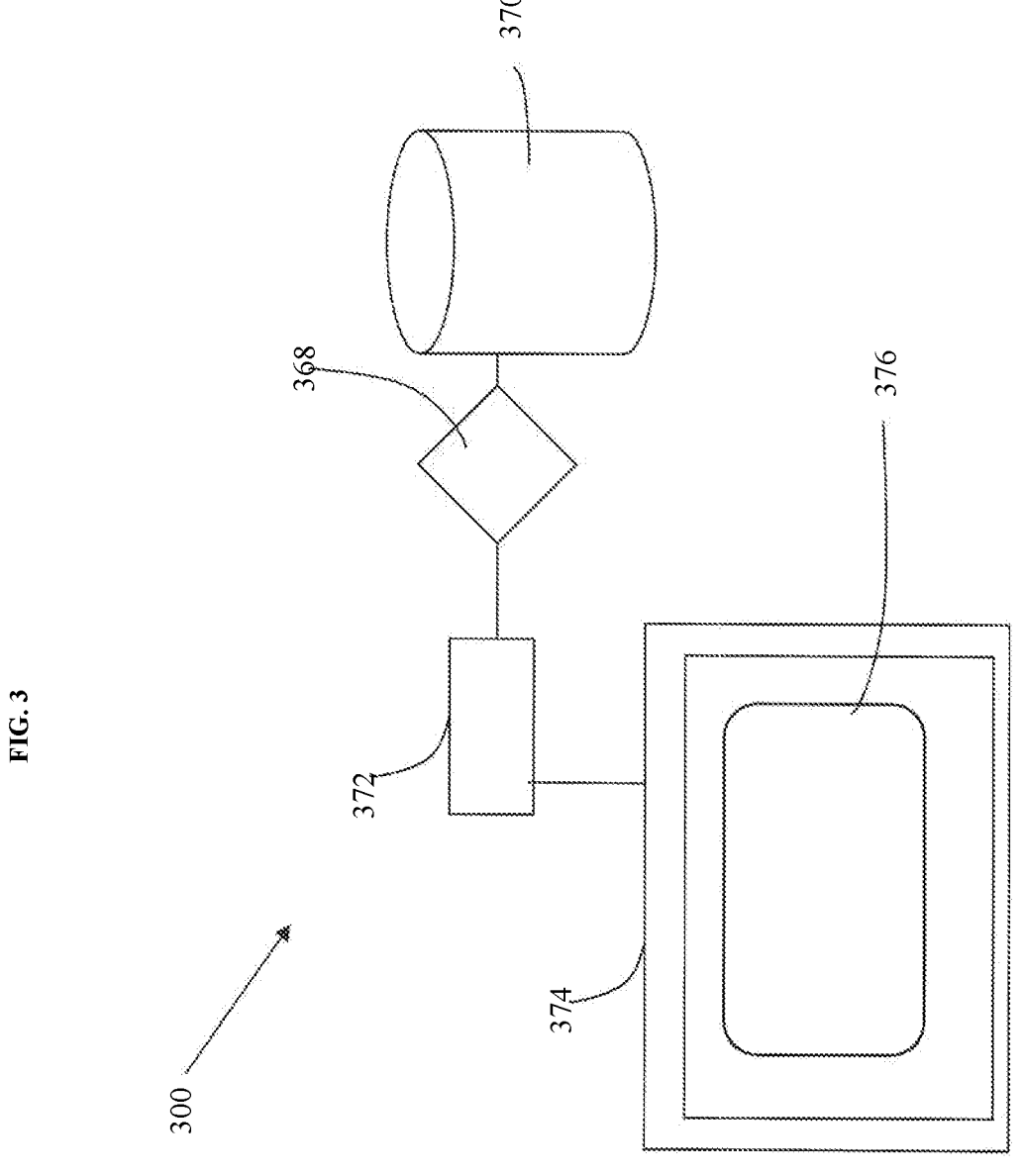
FIG. 3 is a schematic diagram depicting the components of an exemplary system configured and constructed according to some embodiments of the invention.

FIG. 3 illustrates a diagram of an exemplary system 300, which may be a portable device, constructed in accordance with some embodiments of the invention. System 300 includes processing device 368 in communication with a database or memory device 370, communication or data input/output device 372, and a display device 374. In some embodiments, display device 374 is a touch-enabled device and includes a data input device component. Memory device 370 may include data relating to the underlying game and embodiments of the invention as described herein, such as the side wager criteria. A player interface 376 can be presented on display device 374. Player interface 376 may be a virtual representation of a game table layout such as Blackjack or Baccarat game layout and/or one or more player positions for facilitating the transmittal and receipt of wagers in accordance with any of the embodiments herein, such as method 200. Game outcomes are displayed and wagers are tracked using display device 374 and processing device 368 to compare the final player and dealer hands as well as any side wager winning criteria and to determine an outcome and payout to be displayed on display device 374 accordingly.

Any of the methods and games described herein may be played as a live casino game, as a hybrid casino game (with real or virtual cards), on a multi-player electronic platform, on a personal computer for practice, on a hand-held game for practice, on a legally-authorized site on the Internet, or on a play-for-fun site on the Internet, or through any other communication network.

For example, in one embodiment, the players may be remotely located from a live dealer, and a live dealer and a game table may be displayed to players on their monitors via a video feed. The players' video feeds may be transmitted to the dealer and may also be shared among the players at the table. In a sample embodiment, a central station may include a plurality of betting-type game devices and an electronic camera for each game device. A plurality of player stations, remotely located with respect to the central station, may each include a monitor, for displaying a selected game device at the central station, and input means, for selecting a game device and for placing a bet by a player at the player's station relating to an action involving an element of chance to occur at the selected game device.

Figure 4:
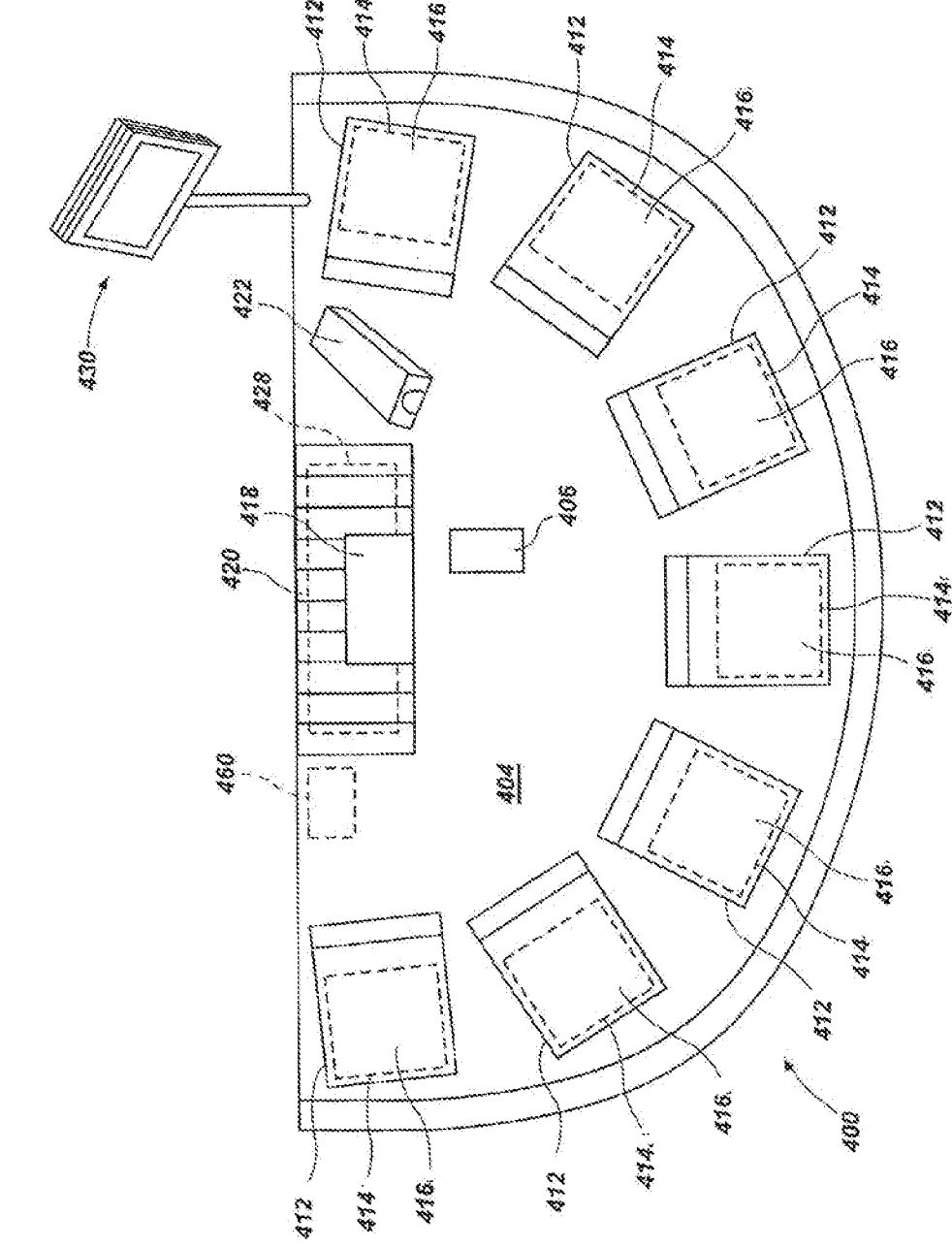
FIG. 4 is a top view of a table configured for implementation of embodiments of wagering games in accordance with this disclosure.

Some embodiments may be implemented at locations including a plurality of player stations. Such player stations may include an electronic display screen for display of game information according to the invention (e.g., cards, wagers, and game instructions) and for accepting wagers and facilitating credit balance adjustments. Such player stations may optionally be integrated in a table format, may be distributed throughout a casino or other gaming site, or may include both grouped and distributed player stations. FIG. 4 is a top view of a suitable table 400 configured for implementing wagering games according to this disclosure. The table 400 may include a playing surface 404. The table 400 may include player stations 412. Each player station 412 may include a player interface 416, which may be used for displaying game information (e.g., game instructions, input options, wager information, game outcomes, etc. and accepting player elections). The player interface 416 may be a display screen in the form of a touch screen, which may be at least substantially flush with the playing surface 404 in some embodiments. Each player interface 416 may be operated by its own local game processor 414 (shown in dashed lines), although in some embodiments a central game processor 428 (shown in dashed lines) may be employed and may communicate directly with player interfaces 416. In some embodiments, a combination of individual local game processors 414 and the central game processor 428 may be employed.

A communication device 460 may be included and may be operably coupled to one or more of the local game processors 414, the central game processor 428, or combinations thereof such that information related to operation of the table 400, information related to the game play, or combinations thereof may be communicated between the table 400 and other devices through a suitable communication medium such as for example wired networks, Wi-Fi networks, or cellular communication networks.

Table 400 may further include additional features, such as a dealer chip tray 420, which may be used by the dealer to cash players in and out of the wagering game, whereas wagers and balance adjustments during game play may be performed using, for example, virtual chips (e.g., images or text representing wagers). For embodiments using physical cards, the table 400 may further include a card-handling device 422 (which may be configured to shuffle, read, and deliver physical cards for the dealer and players to use during game play or, alternatively, a card shoe configured to read and deliver cards that have already been randomized) and a designated area for physical cards 406, which may include multiple locations for the dealer hand and community cards as shown in game table surface 250 (see FIG. 2). For embodiments using virtual cards, the virtual cards may be displayed at the individual player interfaces 416.

The table 400 may further include a dealer interface 418 which, like the player interfaces 416, may include touch screen controls for receiving dealer inputs and for assisting the dealer in administering the wagering game. The table 400 may further include an upright display 430 configured to display images that depict game information such as pay tables, hand counts, historical win/loss information by player, and a wide variety of other information considered useful to the players.

Although an embodiment is described showing individual discrete player stations, in some embodiments, the entire playing surface 404 may be an electronic display that is logically partitioned to permit game play from a plurality of players for receiving inputs from and displaying game information to the players, the dealer, or both.

Some embodiments of the invention are also directed to a non-transitory machine readable media for providing a modified Baccarat wagering game as described herein including one or more software programs, code and/or data segments as necessary to provide any of the methods described herein on one or more machines.

It should be understood that the words "wager," "wagering," "betting" or "bet," or the like, refers to any type of points, money, credits, items of value, including physical or virtual representations thereof, which are placed at stake in that they may be forfeit depending on the occurrence of machine-generated randomly generated outcomes, such as outcomes which may be provided by revealing physical playing cards drawn from one or more decks or groups of randomly-ordered physical playing cards or a random number generator for randomly generating numbers which can be mapped to identify playing card results.

This written description uses examples to disclose the invention and also to enable any person skilled in the art to practice the invention, including making and using any devices or systems and performing any incorporated methods. It should also be noted, that the steps and/or functions listed herein, notwithstanding the order of which steps and/or functions are listed therein, are not limited to any specific order of operation.

One or more embodiments described in this disclosure provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

One or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages. The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®. NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein. In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof. Suitable mobile application development environments are available from several sources.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

The systems and methods of the invention may also be implemented on a mobile computing device which corresponds to, for example, a cellular communication device (e.g., feature phone, smartphone etc.) that is capable of telephony, messaging, and/or data services. In variations, the mobile computing device can correspond to, for example, a tablet or wearable computing device. Still further, the mobile computing device can be distributed amongst multiple portable devices.

Computer readable program instructions of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified herein. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

While exemplary apparatus, systems, and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting the scope of the invention in any way. Accordingly, the invention embraces alternatives, modifications, and variations which fall within the spirit and scope of the invention as set forth herein, in the claims and any equivalents thereto.

The invention claimed is:

1. A specialized gaming table configured to provide a second game for an underlying game of Blackjack, the specialized gaming table comprising a card reader, a display device, a processing device, memory and a random number generator being in communication and configured to enable the specialized gaming table to:

communicate playing card data generated by the card reader to the processing device, the playing card data relating to an initial hand of playing cards in the underlying game of Blackjack received by a player at the specialized gaming table;

determine by the processing device an initial hand score associated with the initial hand of playing cards based on the playing card data;

the processing device comparing the initial hand score with a preset one or more Blackjack hand scores stored in memory;

the processing device detecting a triggering event based on a determination of the player receiving the initial hand of playing cards in the underlying game of Blackjack having the initial hand score which is equal to the preset one or more Blackjack hand scores;

responsive to the processing device detecting the triggering event, the processing device generating a display of a user interface on the display device including displaying one or more selectable options for the second game, the one or more selectable options being displayed by the processing device in one or more display positions on the user interface, wherein each display position of the one or more display positions is randomly determined by the processing device in communication with the random number generator, and wherein each selectable option of the one or more selectable options is associated by the processing device with a numerical value, the numerical value associated with each selectable option being revealed on the user interface responsive to receiving a selection of each selectable option through the user interface;

responsive to the processing device detecting receiving a wager and a selectable option of the one or more selectable options, the processing device generating the display of a second game numerical value on the user interface, the second game numerical value being the numerical value associated with the selectable option, wherein the selection of the selectable option deactivates the selectable option, whereby the selectable option is displayed on the user interface by the processing device as being unavailable to be selected by another player;

the processing device determining a second game hand score, the second game hand score being the combination of the initial hand score and the second game numerical value; and the processing device determining a winner of the second game by the processing device comparing the second game hand score with a preset numerical value.

2. The specialized gaming table of claim 1, wherein the preset one or more Blackjack hand scores comprise all Blackjack hand scores in the range from twelve to twenty.

3. The specialized gaming table of claim 1, wherein the one or more selectable options comprise virtual representations of one or more decks of playing cards.

4. The specialized gaming table of claim 1, wherein the preset numerical value is twenty-one.

5. A specialized gaming table configured to provide a second game for an underlying game of Baccarat, the specialized gaming table comprising a card reader, a display device, a processing device, memory and a random number generator being in communication and configured to enable the specialized gaming table to:

communicate playing card data generated by the card reader to the processing device, the playing card data relating to an initial hand of playing cards in the underlying game of Baccarat wagered on by a player at the specialized gaming table;

determine by the processing device an initial hand score associated with the initial hand of playing cards based on the playing card data;

the processing device comparing the initial hand score with a preset one or more Baccarat hand scores stored in memory;

the processing device detecting a triggering event based on a determination of the player wagering on the initial hand of playing cards in the underlying game of Baccarat having the initial hand score which is equal to the preset one or more Baccarat hand scores;

responsive to the processing device detecting the triggering event, the processing device generating a display of a user interface on the display device including displaying one or more selectable options for the second game, the one or more selectable options being displayed by the processing device in one or more display positions on the user interface, wherein each display position of the one or more positions is randomly determined by the processing device in communication with the random number generator, and wherein each selectable option of the one or more selectable options is associated by the processing device with a numerical value, the numerical value associated with each selectable option being revealed on the user interface responsive to receiving a selection of each selectable option through the user interface;

responsive to the processing device detecting receiving a wager and a selectable option of the one or more selectable options, the processing device generating a display of a second game numerical value on the user interface, the second game numerical value being the numerical value associated with the selectable option, wherein the selection of the selectable option deactivates the selectable option, whereby the selectable option is displayed on the user interface by the processing device as being unavailable to be selected by another player;

the processing device determining a second game hand score, the second game hand score being the combination of the initial hand score and the second game numerical value according to the rules of the underlying game of Baccarat; and the processing device determining a winner of the second game by the processing device comparing the second game hand score with a preset numerical value.

6. The specialized gaming table of claim 5, wherein the preset one or more Baccarat hand scores comprise all Baccarat hand scores in the range from zero to eight.

7. The specialized gaming table of claim 1, wherein the one or more selectable options comprise virtual representations of one or more decks of playing cards.

8. The specialized gaming table of claim 1, wherein the preset numerical value is nine.

* * * * *